(12) United States Patent
Jain et al.

(10) Patent No.: US 8,184,456 B1
(45) Date of Patent: May 22, 2012

(54) ADAPTIVE POWER CONVERTER AND RELATED CIRCUITRY

(75) Inventors: Praveen K. Jain, Kingston (CA); Mohammed S. Agamy, Kingston (CA)

(73) Assignee: International Rectifier Corporation, El Segundo, CA (US)

( * ) Notice: Subject to any disclaimer, the term of this patent is extended or adjusted under 35 U.S.C. 154(b) by 847 days.

(21) Appl. No.: 12/198,605

(22) Filed: Aug. 26, 2008

(51) Int. Cl.
*H02M 3/335* (2006.01)

(52) U.S. Cl. .................. 363/21.02; 363/21.1

(58) Field of Classification Search .......... 363/16, 363/17, 20, 21.01, 21.02, 21.04–21.1, 84, 363/89, 97, 98, 131, 132; 323/268, 271, 323/282, 285
See application file for complete search history.

(56) References Cited

U.S. PATENT DOCUMENTS

| | | | | |
|---|---|---|---|---|
| 5,446,647 A | * | 8/1995 | Ikeda et al. | 363/89 |
| 6,344,986 B1 | * | 2/2002 | Jain et al. | 363/89 |
| 6,535,399 B2 | * | 3/2003 | Gu | 363/17 |
| 2009/0034298 A1 | * | 2/2009 | Liu et al. | 363/17 |

* cited by examiner

*Primary Examiner* — Matthew Nguyen
(74) *Attorney, Agent, or Firm* — Chapin IP Law, LLC

(57) ABSTRACT

A resonant power converter circuit stage can be configured to: i) receive a rectified voltage derived from an AC input voltage; ii) convert the rectified voltage to an internal voltage based on the application of a duty cycle that varies depending on the input voltage and the output dynamic load, and iii) convert the internal voltage to a DC output voltage for driving the dynamic load based on application of a switching frequency that varies depending on a dynamic load. The efficiency of the power converter system can be increased by setting the internal DC voltage magnitude to be load adaptive. Variation of the internal DC voltage depending on the dynamic load enables the resonant converter circuit to operate at a switching frequency near its optimum resonance frequency. This method results in constant power converter system efficiency over a wide range of loading. In order to further increase the light load efficiency interleaved resonant power converters with load, adaptive internal DC voltage are used.

14 Claims, 9 Drawing Sheets

ADAPTIVE POWER CONVERTER AND RELATED CIRCUITRY

BACKGROUND

It is known that conventional power supplies can be used to convert AC power into DC power.

A drawback of converting AC power into DC power is that a corresponding AC/DC converter, if not designed properly, can inject unwanted harmonic frequencies into the AC line (input current). Certain regulatory agencies limit the degree to which harmonic frequencies can be injected in the line voltage because injection of too many harmonics can be harmful to operation of other devices that use the AC line voltage.

In comparison to the resistive type of loads used fifty years ago, conventional electronic equipment such as, computers, servers, data storage devices, etc., tends to be more reactive. Such conventional electronic equipment can therefore cause an unwanted phase displacement between the line voltage and corresponding input current. When powering a resistive load, there is little or no phase displacement. When powering a reactive load, there can be substantial phase displacement resulting in poor conversion efficiency.

In general, a so-called power factor of an AC/DC converter represents a ratio of real power to apparent power. The power factor is typically defined as a number between 0 and 1 or a percentage. However, power factors are sometimes conveyed as a percentage. For example, a power factor=0.5 is sometimes conveyed by engineers as being 50%.

Ideally, the power factor of a power converter system is 1.0, which means that the line voltage and consumed line current (input current) are both sinusoidal and in phase with each other. A power factor of a system is 0 when the current leads or lags the voltage by 90 degrees.

For two systems transmitting the same amount of real power to a load, the system with a lower power factor of the two will have higher circulating currents due to energy that returns to the source from energy storage in the load. Presence of the higher circulating currents in the system, as a result of a lower power factor, results in higher losses and reduced overall power transmission efficiency. Thus, a circuit having a lower power factor will have a higher apparent power and higher losses for the same amount of real power transfer.

SUMMARY

As discussed above, conventional AC/DC power converter circuits can suffer from a number of deficiencies such as a low power factor. For example, the efficiency of a power converter can be relatively poor when the power converter has a corresponding low power factor.

Techniques discussed herein deviate with respect to conventional techniques. For example, certain embodiments herein are directed to enhancing an efficiency of a power converter circuit by adjusting the switching frequency and pulse width depending on the state of the dynamic load and input voltage.

More specifically, use of single stage power factor correction in three-level resonant AC/DC converters solves many problems that present single stage power factor corrected (SSPFC) converters face today, namely, high component stresses, high circulating currents, and low efficiency.

One drawback of conventional resonant SSPFC AC/DC converter techniques is that the efficiency of a converter drops as the load is reduced because the converter starts to drift away from its resonance frequency, thus leading to more circulating currents and conduction losses.

According to embodiments herein, a load adaptive dc-bus voltage control method is proposed in order to force the converter to operate closer to its maximum efficiency frequency for a wider range of loading, and thus obtaining a constant efficiency for a wide loading range.

As will be discussed later in this specification, embodiments herein can include interleaving of multiple resonant power converter circuits to further enhance overall efficiency.

In general, embodiments herein include a resonant power converter circuit stage configured to: i) receive a rectified voltage derived from an AC input voltage; ii) convert the rectified voltage to an internal bus voltage using pulse width modulation. The value of the bus voltage is set based on the input voltage amplitude, which varies depending on the dynamic load, and iii) convert the internal voltage to a DC output voltage for driving the dynamic load by means of a variable frequency control circuit.

In one embodiment, controlling the switching frequency and/or corresponding duty cycle enables operation of the power supply near unity input power factor.

Pulse width modulation can be used to adjust the magnitude of an internal (DC) voltage of the resonant power converter circuit. The resonant power converter circuit can be configured to convert the internal (DC) voltage to the output voltage by controlling the converter switching frequency.

In one embodiment, the resonant power converter circuit can include a synchronous rectifier circuit configuration at a respective output stage that converts the internal DC voltage into the output voltage. The synchronous rectifier circuit can form part of or be integrated with a resonant circuit in the resonant power converter circuit. In one embodiment, the resonant circuit such as, for example, an LCC circuit can reside between a switching stage of the resonant power converter circuit and the synchronous rectifier circuit (output stage) to facilitate conversion of the internal voltage to the DC output voltage.

In certain embodiments, during operation of the resonant power converter circuit, the switching frequency can be adjusted to be nearer in value to or around a value of an optimum resonant frequency of the resonant power converter circuit for a given state of the dynamic load. Such adjustments of the switching frequency increase the efficiency of the resonant power converter circuit over the range of the dynamic load because operation of the switching frequency nearer in value to the optimum resonant frequency of the resonant circuit reduces overall conduction losses.

The AC/DC power converter circuit as described herein can include a control circuit configured to regulate the DC output voltage of the resonant power converter circuit within an acceptable voltage range based at least in part on adjusting the switching frequency of corresponding control signals depending on the dynamic load. In other words, a control circuit can be configured to adjust the switching frequency via frequency modulation techniques to control a magnitude of the output voltage.

For example, in a specific embodiment, the control circuit includes a monitor circuit configured to monitor the DC output voltage of the resonant power converter circuit. The control circuit also can include a generator circuit configured to generate an error voltage based on a comparison of the DC output voltage with a reference voltage. Based on the error voltage, the control circuit adjusts a switching frequency of the resonant power converter circuit to maintain the DC output voltage within a voltage tolerance.

In further embodiments, the control circuit is configured to adjust a duty cycle of activating switches in the resonant power converter circuit to control a corresponding power factor and regulate the internal (DC) voltage of the resonant power converter circuit. Controlling the power factor of the AC/DC power converter circuit so that the input line current is more in phase with the input line voltage and has a low harmonic content (especially low order harmonics), alleviates the drawbacks as discussed above in the background section. That is, the AC/DC converter according to embodiments herein can operate at a higher efficiency because it has lower conduction losses and its switching losses are minimized as compared to classical SSPFC converters where pulse width modulation alone is employed to control both the power factor and output voltage.

Accordingly, embodiments herein include a control circuit configured to: i) regulate the DC output voltage within a range based on adjusting a switching frequency of control signals depending on a magnitude of the output voltage, and ii) control the input power factor and the internal (DC) voltage of the resonant power converter circuit based on adjusting a duty cycle of activating switches in the resonant power converter circuit to convert the rectified input voltage to the internal voltage.

In accordance with further embodiments, an AC/DC power converter circuit can include multiple resonant power converter circuit modules that are selectively activated to increase an efficiency of converting an AC input voltage to a DC output voltage over a wider power range. Such an embodiment can be useful in applications in which a single resonant power converter circuit module can be efficiently used to produce the output voltage at light load conditions. Multiple resonant power converter circuit modules can be activated in parallel to produce the output voltage during higher load conditions when the dynamic load consumes more power.

More specifically, an AC/DC power converter circuit as described herein can include multiple resonant power converter circuit modules including a first resonant power converter circuit and a second resonant power converter circuit. In an example embodiment, the first resonant power converter circuit is configured to: i) convert a rectified voltage to a first internal voltage based on application of a first switching frequency that varies depending on a dynamic load, and ii) convert the first internal voltage to a DC output voltage for driving the dynamic load. The second resonant power converter circuit is configured to: i) convert the rectified voltage to a second internal voltage based on application of a second switching frequency that varies depending on the dynamic load, and ii) convert the second internal voltage to a DC output voltage for driving the dynamic load. The AC/DC power converter circuit also includes a control circuit configured to: i) control operation of the first resonant power converter circuit and the second resonant power converter circuit, and ii) generate the first switching frequency and the second switching frequency.

In a similar manner as discussed above, the control circuit can be configured to monitor the output voltage. In response to detecting that the dynamic load is below a threshold value, the control circuit activates the first resonant power converter circuit to produce the DC output voltage and deactivates the second resonant power converter circuit. As mentioned above, operating fewer than all resonant power converter circuit modules is more efficient because the resonant power converter circuit modules are more efficient at higher power outputs.

Of course, a power converter system can include a threshold value in which a single or group of several resonant power converter circuit modules cannot supply enough power to keep the output voltage within regulation. Under such conditions, such as when the dynamic load is above a threshold value, the control circuit activates both the first resonant power converter circuit and the second resonant power converter circuit to produce the DC output voltage.

In this latter embodiment including multiple resonant power converter circuit modules, the control circuit can be configured to: monitor the DC output voltage produced by multiple resonant power converter circuits; generate at least one error voltage based on a comparison of the DC output voltage with at least one reference voltage; and adjust the first switching frequency and the second switching frequency based on the at least one error voltage to maintain the DC output voltage within a tolerance.

Note that in further embodiments, a computer-storage medium can include instructions stored thereon for executing operations as described herein. For example, the instructions, when executed by a controller (e.g., a processor and corresponding memory), enable the controller to perform operations of: i) regulating an output voltage within a range based on adjusting the switching frequency of the resonant power converter circuit depending on a magnitude of the output voltage; and ii) controlling the input power factor and internal (DC) voltage of the resonant power converter circuit based on adjusting a duty cycle of activating switches in the resonant power converter circuit to convert a rectified voltage into the output voltage. Thus, although not necessary, a controller circuit according to embodiments herein can include a processor and memory for carrying out the operations as described herein.

Note also that each of the different features, techniques, configurations, etc. discussed herein can be executed independently or in combination with any or all other features also described herein. Accordingly, the present invention can be embodied, viewed, and claimed in many different ways.

This brief description purposefully does not specify every embodiment and/or incrementally novel aspect of the present disclosure or claimed invention. Instead, this brief description only provides a preliminary discussion of different embodiments and corresponding points of novelty over conventional techniques. For additional details and/or possible perspectives or permutations of the invention, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

Figure 1:
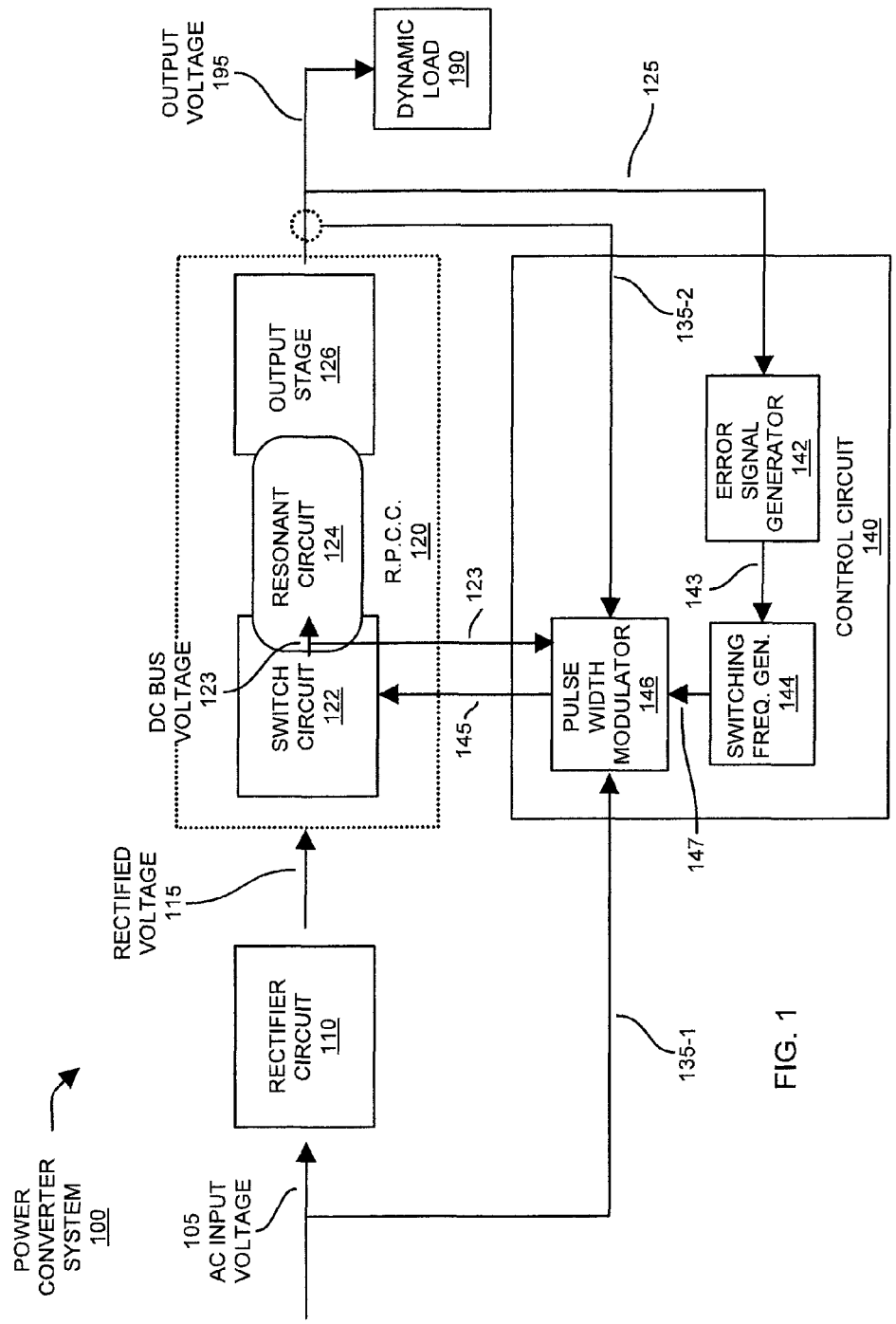
FIG. 1 is an example diagram of a power converter system according to embodiments herein.

FIG. 1 is an example diagram illustrating power converter circuit system 100 according to embodiments herein. As shown, rectifier circuit 110 receives input voltage 105 such as, for example, a time-varying AC voltage signal. The rectifier circuit 110 converts the input voltage 105 into rectified voltage 115.

Resonant power converter circuit 120 receives the rectified voltage 115 and converts it into output voltage 195. More specifically, in one embodiment, the resonant power converter circuit 120 is configured to: i) receive rectified voltage 115 derived from an AC input voltage 105; ii) convert the rectified voltage 115 to an internal voltage such as internal voltage 123 based on application of control signals 145 that vary depending on the dynamic load, and iii) convert the internal voltage 123 to output voltage 195 for driving the dynamic load 190.

As will be discussed later in this specification, the control circuitry 140 can vary a switching frequency of the control signals 145 depending on a state of the dynamic load 190. In other words, adjusting the switching frequency of control signals 145 enables the control circuit 140 to control the output voltage 195 within an acceptable voltage range.

For example, the resonant power converter circuit 120 can include switch circuitry 122 driven by the control signals 145 to convert the rectified voltage 115 into the internal DC bus voltage 123. Adjusting the duty ratio of control signals 145 applied to switch circuit 122 changes a magnitude of the internal DC bus voltage 123 produced by switch circuit 122. Subsequent stages of the resonant power converter circuit such as, for example, a combination of resonant circuit 124 and output stage 126 convert the internal DC bus voltage 123 produced by the switch circuit 122 to the output voltage 126.

In an example embodiment, the output stage 126 is a synchronous rectifier circuit. However, generally any suitable circuit can be used at output stage 126 for final generation of the output voltage 195.

As shown, the switch circuit 122 resonant circuit 124, and output stage 126 can be integrated to provide the functionality as described herein. For example, the resonant circuit 124 can be coupled to switch circuit 122 at an input end, and output stage 126 at an output end. As previously discussed, the switch circuit 122 of the resonant power converter circuit 120 and the output stage 126 facilitate conversion of the internal DC bus voltage 123 produced by switch circuit 122 to the DC output voltage 195.

According to one embodiment, during operation of the resonant power converter circuit 120, the control circuit 140 adjusts the reference value of the internal DC voltage 123 depending on a state of the dynamic load 190. This change in the reference value forces the error signal generator 142 and switching frequency generator 144 to adjust the switching frequency of the resonant power converter circuit to be closer to the resonance frequency of the resonant circuit 124. Such adjustments of the switching frequency 147 increases the efficiency of the resonant power converter circuit over the range of the dynamic load 190 because operation nearer the optimum resonant frequency of the resonant circuit 124 reduces overall conduction losses in power converter system 100.

As mentioned above, control circuit 140 regulates the DC output voltage 195 of the resonant power converter circuit 120 within an acceptable voltage range based at least in part on adjusting the switching frequency 147 of control signals 145 depending on the dynamic load 190.

In a specific embodiment, the control circuit 140 includes a monitor circuit such as, for example, error signal generator 142. The error signal generator 142 monitors a parameter such as, for example, the output voltage 195 of the resonant power converter circuit 120 and generates an error signal 143 (error voltage) based on a comparison of the output voltage 195 with a corresponding reference voltage.

In one embodiment, the error signal generator 142 is a voltage controlled oscillator circuit whose output frequency varies depending on a magnitude of the input voltage, which in this case is output voltage 195.

Accordingly, based on the error signal 143, the switching frequency generator 144 of control circuit 140 adjusts a magnitude of switching frequency 147 of control signals 145 to maintain the output voltage 195 within a voltage tolerance range. As mentioned above, the switching frequency 147 generated by the control circuit 140 represents the carrier frequency of control signals 145 that are used to control activation and deactivation of switches in switch circuit 122 to produce the internal DC bus voltage 195.

In further embodiments, the control circuit 140 is configured to adjust a duty cycle of activating switches in switch circuit 122 to control a corresponding input power factor associated with power converter system 100. For example, the pulse width modulation circuit 146 monitors a phase of the input voltage, an internal DC (bus) voltage 123 and a current or power consumed by the dynamic load 190. Based on one or more of such parameters, the control circuit 140 controls a duty cycle of the control signals 145 such that the input current contains low amplitudes of low order harmonics and is more in phase with the input voltage 105. Controlling the power factor of the power converter system 100 and, more specifically, power converter circuit 120 to a more optimum value alleviates the drawbacks as discussed above in the background section. That is, the AC/DC converter according to embodiments herein can operate at a higher efficiency because there are fewer conduction losses while operating the power converter system 100 at a higher power factor.

Accordingly, embodiments herein include a control circuit 140 configured to: i) regulate the output voltage 195 within a range based at least in part on adjusting the switching frequency of control signals 145 depending on a magnitude of the output voltage 195, and ii) control the input power factor of the resonant power converter system 100 and the internal DC (bus) voltage 123 based on adjusting a duty cycle or pulse width modulation of the switching signals 145. iii) generates a load adaptive internal DC voltage reference that forces the resonant power circuit 120 to operate at a switching frequency 147 that is close to its resonance frequency in order to improve the power converter system 100 efficiency. As mentioned above, the control circuit 140 generates control signals 145 to activate/deactivate switches in the switch circuit 122 to convert the rectified input voltage to the internal DC bus voltage that is, in turn, used to generate the output voltage 195.

Also, in accordance with the discussion above (and below), embodiments herein include a power converter system 100 having multiple feedback loops. More specifically, feedback signal 135-1 provides an indication of the phase associated with the input voltage 105. Feedback signal 135-2 provides a measure of the output current supplied to the dynamic load 190. Thus, the control circuit 140 can adjust the pulse width modulation of the switching frequency 147 for controlling the power factor of the power converter system 100. Feedback signal 125 conveys output voltage 195 to error signal generator 142. As mentioned above, the error signal generator 142 adjusts the switching frequency 147 of control signals 145 to control the magnitude of output voltage 195. Feedback signal from the internal DC (bus) voltage 123 is used to regulate the internal DC bus voltage 123 that is then input to the resonant circuit 124. The internal bus voltage 123 is regulated in order to reduce component stresses and, as mentioned above, to improve the resonant power converter efficiency by making it operate at a switching frequency 147 close to or nearer the resonance frequency of the resonant circuit 124.

Thus, one feedback loop (e.g., feedback signal 125) of the AC/DC power converter system 100 is used for frequency modulation while a second set of one or more loops such as feedback loop 135-1 and feedback loop 135-2 of the AC/DC power converter system 100 are used for pulse width modulation of the control signals 145 to maintain the output voltage 195 and maintain high power conversion efficiency and high input power factor.

Figure 2:
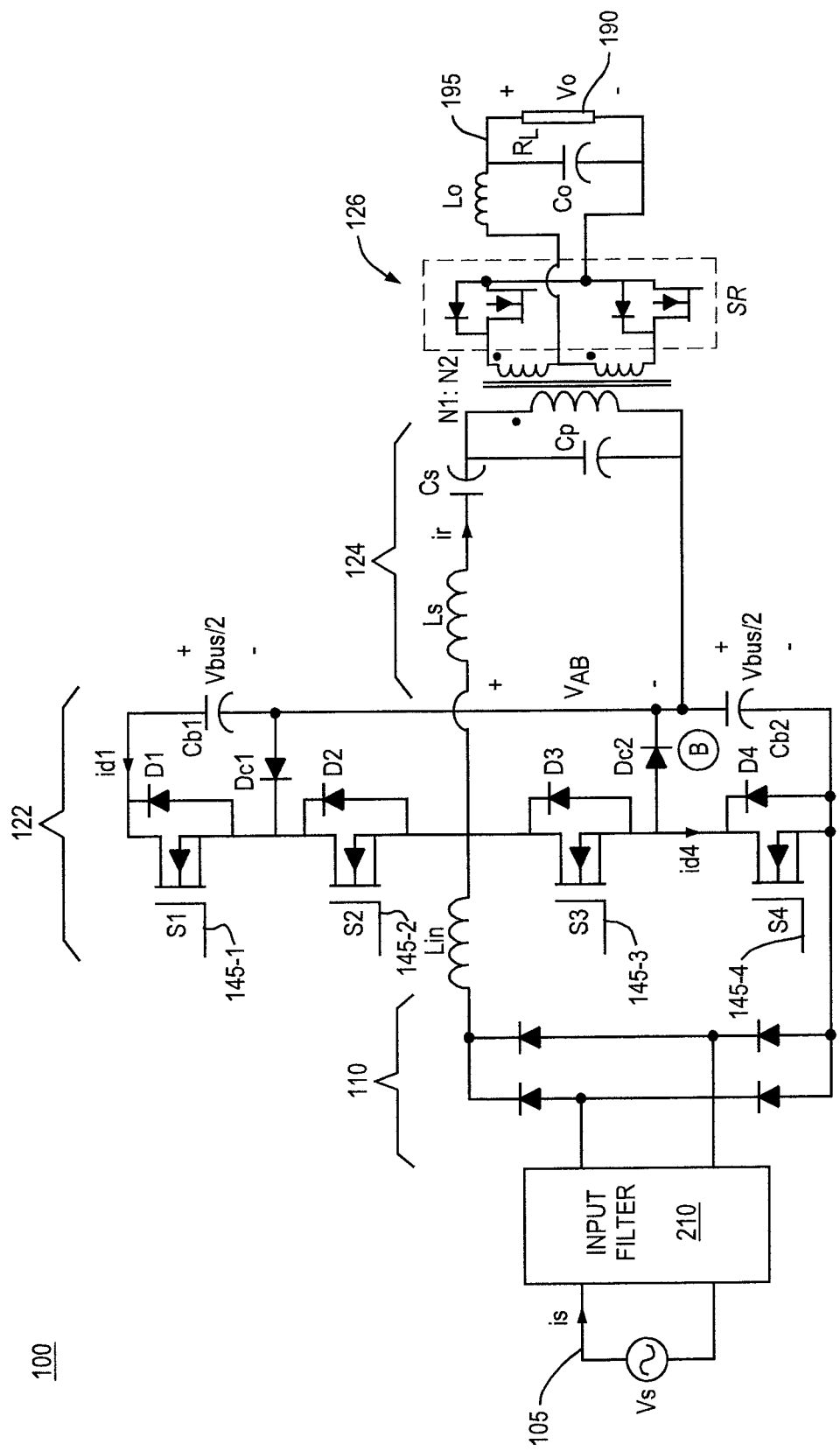
FIG. 2 is an example diagram of a power converter circuit according to embodiments herein.

FIG. 2 is an example diagram illustrating a power converter system 100 according to embodiments herein.

The proposed converter topology can integrate the operation of a boost power factor pre-regulator with a three-level resonant dc-dc converter. For example, the example configuration of power converter system 100 in FIG. 2 shows a three-level series-parallel LCC ($L_s$, $C_s$, $C_p$) resonant circuit 124 with an input boost inductor ($L_{in}$) directly connected to the lower pair of switches $S_2$ and $S_3$.

The boost inductor ($L_{in}$) can operate in either the continuous or discontinuous conduction mode.

The dc-bus of power converter system 100 is comprised of the two capacitors ($C_{b1}$) and ($C_{b2}$). These capacitors provide the necessary hold up time and greatly reduce the effect of low frequency ripples at the output voltage 195.

The capacitors are designed to have equal values and are charged symmetrically; therefore, each can be configured to store half of the dc-bus voltage in the steady-state condition.

The two diodes ($D_{c1}$) and ($D_{c2}$) serve to clamp the switch voltages to half that of the dc-bus. In one embodiment, the series-parallel resonant converter 124 is used due to the fact that it is able to operate in a buck-boost mode according to the applied switching frequency of control signals 145. This feature is useful in order to be able to adjust the output voltage 195 throughout a respective power line cycle associated with input voltage 105.

In one embodiment, the LCC resonant circuit 124 provides fast output regulation and low output voltage ripple as well as, input/output isolation; zero voltage switching. It also requires the use of an LC output filter ($L_O C_O$), which results in an almost ripple free output voltage; and high conversion efficiency.

By designing the converter to operate close to its resonant frequency, high efficiency can be obtained for a wide range of input voltage and output load current. Other types of resonant circuits that have voltage step up and step down capabilities such as series resonant LLC can also be used for this application, which will be illustrated in a later section.

The input filter 210 of power converter system 100 reduces the high (switching) frequency components of the input current, which may be especially important in the case of discontinuous input inductor current operation.

As mentioned above, the output stage 126 of power converter system 100 can be a synchronous rectifier (SR) followed by an LC filter ($L_o$ and $C_o$) to smooth the output voltage 195.

Figure 3:
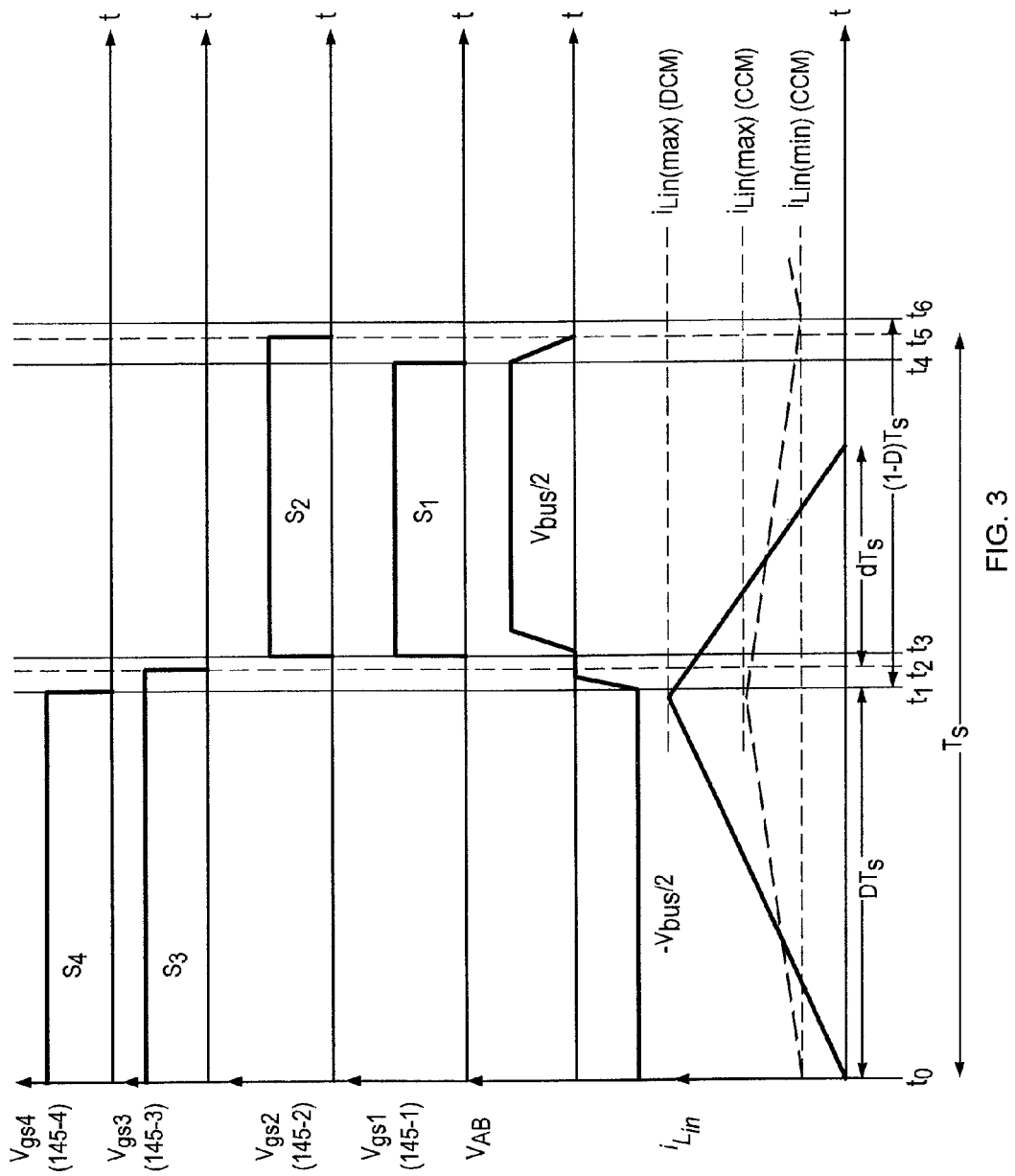
FIG. 3 is an example timing diagram according to embodiments herein.

FIG. 3 is an example diagram illustrating a timing diagram 310 associated with power converter system 100 according to embodiments herein.

The timing diagram 310 illustrates a single period, $T_s$, of switching frequency 147. In general, the switching frequency of the operating resonant power converter circuit 120 is substantially higher than a frequency of input voltage 105. For example, the input voltage can have a frequency around 60 hertz. The switching frequency 147 associated with control signals 145 can be greater than several thousand hertz.

Signals 145-1, 145-2, 145-3, and 145-4 represent control signals 145 generated by control circuit 140 for control switching of corresponding switches $S_1$, $S_2$, $S_3$, and $S_4$ in switch circuit 122. For example, control circuit 140 generates signal 145-4 to control operation of switch $S_4$. Control circuit 140 generates signal 145-3 to control operation of switch $S_3$. Control circuit 140 generates signal 145-2 to control operation of switch $S_2$. Control circuit 140 generates signal 145-1 to control operation of switch $S_1$. During operation, the control circuit 140 changes a duty cycle, D, or pulse width modulation associated with control signals 145 to control the power factor and the internal (DC) voltage 123 of power converter system 100.

$V_{AB}$ (resonant tank input voltage) represents a voltage between node A and node B of FIG. 2.

$I_{Lin}$ represents an amount of current through inductor $L_{in}$ at different times during a respective switching cycle between $t_0$ and $t_6$. As previously discussed, the control circuit 140 adjusts switching frequency 147, thus changing a value of period $T_s$, to control a magnitude of the output voltage 195.

In general, the stages of operation for this converter during one switching cycle can be substantially the same for continuous conduction mode (CCM) and discontinuous conduction modes (DCM) with a few minor differences that are outlined in the following discussion.

The stages of operation of power converter system 100 are as follows:

Stage 1 ($t_0 \leq t \leq t_1$: Switches $S_3$ and $S_4$ are ON based on control signals 145-3 and 145-4. In this case the current in the boost inductor ($L_{in}$) increases linearly as it stores energy from the supply. The current flowing through the switches is the sum of the resonant and boost inductor currents. The voltage across the terminals of the resonant circuit is $$\frac{-V_{bus}}{2}.$$

Note that in case of discontinuous conduction the input inductor current rises from zero to its peak value ($I_{Lin(max)}$).

Note that in continuous conduction mode it rises from an initial minimum value ($I_{Lin(min)}$) to its maximum value ($I_{Lin(max)}$).

The minimum and maximum values here indicate those during one switching cycle not absolute maxima and minima. Also, the maximum values of input inductor current can differ from continuous and discontinuous modes.

This stage of operation ends at $t=t_1=DT_s$. As mentioned above, D represents the duty cycle of the boost stage and $T_s$ is the switching period.

Stage 2 ($t_1 \leq t \leq t_2$): Switch $S_4$ is turned OFF (its body capacitor forcing Zero Voltage turn off) and the clamping diode $D_{c2}$ serves to clamp the switch voltage to half the DC bus voltage. The current in the boost inductor is also diverted to the upper switches discharging their parallel capacitors. The voltage across the resonant circuit decreases to zero the resonant current circulates through switch $S_3$ and clamping diode $D_a$.

Stage 3 ($t_2 \leq t \leq t_3$): Switch $S_3$ is turned OFF (Zero voltage turn off due to body capacitance of the switch) and the inductor current continues to charge the DC bus capacitors. The resonant current contributes to the discharge of the switch capacitances and when they are fully discharged then both currents flow through the body diodes of switches $S_1$ and $S_2$. The voltage across the resonant circuit rises to $$\frac{V_{bus}}{2}.$$

Stage 4 ($t_3 \leq t \leq t_4$): Switches $S_1$ and $S_2$ are turned ON with zero voltage switching. The current flowing through the switches in this case becomes the difference between the resonant current and the boost inductor current. The voltage across the resonant circuit remains at $$\frac{V_{bus}}{2}.$$

Stage 5 ($t_4 \leq t \leq t_5$): Switch $S_1$ is turned OFF and diode $D_a$ clamps its voltage to $$\frac{V_{bus}}{2}.$$

The resonant circuit voltage again drops to zero, with the resonant current circulating through $S_2$ and $D_a$.

For the case of discontinuous conduction mode the inductor current will have decayed to zero at this point and the only current circulating in the circuit will be the resonant current.

For continuous conduction mode the input inductor current will continue flowing through the body diodes of the switches until the end of stage 6.

Stage 6 ($t_5 \leq t \leq t_6$): Switch $S_2$ is turned OFF and the resonant current is diverted to discharge the body capacitors and body diodes of switches $S_3$ and $S_4$ where the body diodes start conducting after the switch capacitors are fully discharged.

Each successive cycle of the switching frequency is then repeated by initially turning ON with switches $S_3$ and $S_4$ via zero voltage switching and then switching on of switches $S_1$ and $S_2$.

Control Method

Figure 4:
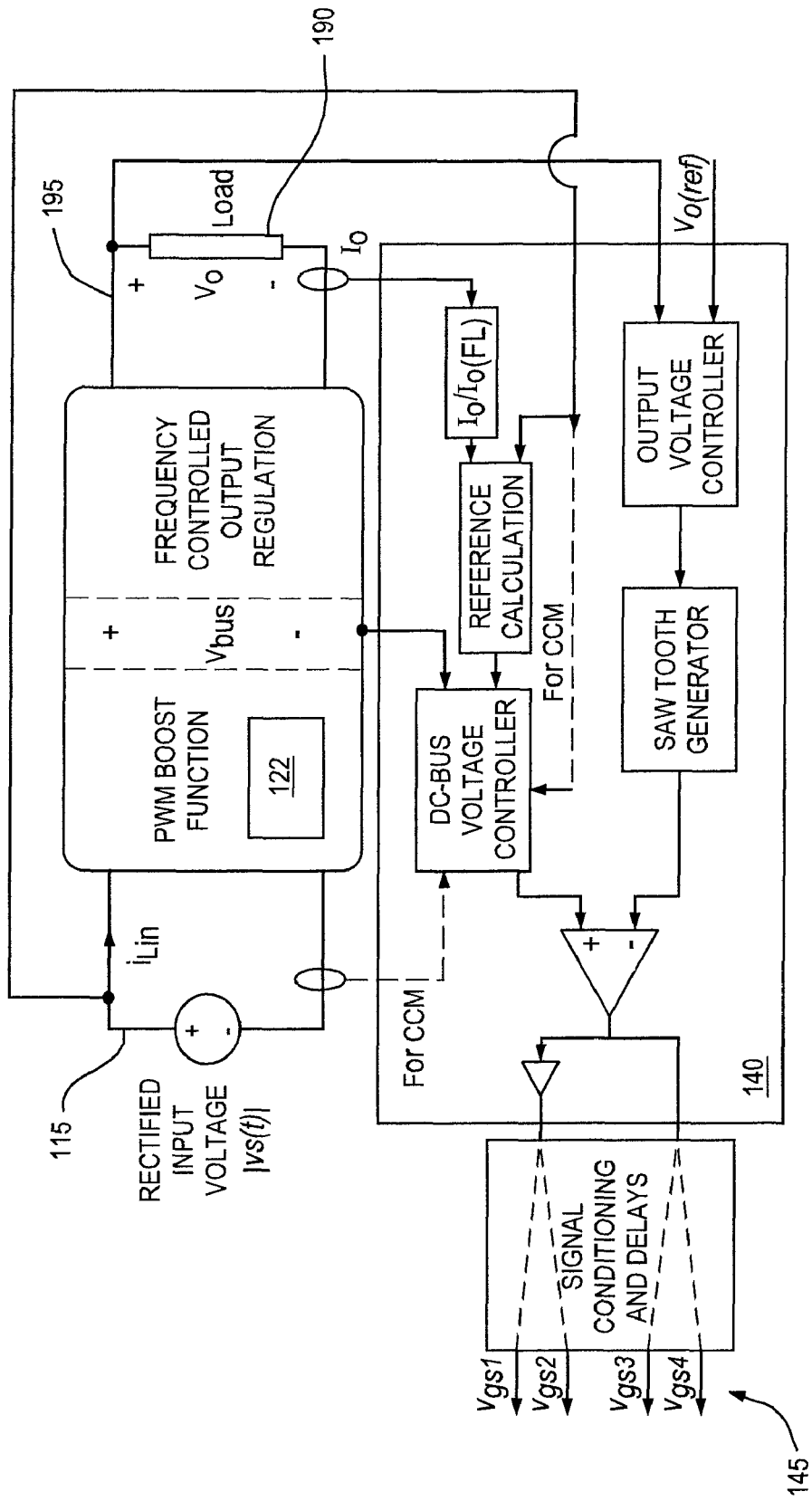
FIG. 4 is an example block diagram illustrating a power converter circuit according to embodiments herein.

FIG. 4 is an example diagram illustrating a power converter system 100 according to embodiments herein. In such an embodiment, since this power converter system 100 is formed by the integration of two converters, and since the converter is comprised of multiple switches, there is more than one variable that can be used for the control purpose. For example, the control circuit 140 can be configured to control multiple different control variables at a time in order to control both the output voltage as well as the DC bus voltage.

The control variables can include: 1) adjusting the switching frequency ($f_s$) of the resonant converter to control the output voltage and 2) adjusting the duty ratio (D) of the boost function to regulate the dc-bus voltage to the desired level. Therefore, the internal dc-bus voltage can be adjusted to a desired limit regardless of the loading condition.

In one embodiment, the output voltage controller and corresponding control loop (e.g., feedback from output voltage 190) generates the frequency of the carrier signal for control signals 145. The control circuit 140 can be configured to adjust the pulse width based on a control loop of monitoring the dc-bus voltage associated with the resonant power converter circuit 120.

The reference value of the dc-bus voltage at full load can be selected based on a magnitude of the input voltage the input voltage level based on the equation:

$$V_{bus(ref)} = 1.285 V_m + 200 \quad (1)$$

where, $V_{bus(ref)}$ represents the reference dc-bus voltage and $V_m$ is the peak of the sinusoidal input voltage.

In order to further improve the converter efficiency, it may be desirable to make the resonant circuit 124 operate close or nearer to its resonant frequency of oscillation for as wide a range of loading (dynamic load 190) as possible. This can be achieved if the reference dc-bus voltage level is made load adaptive such that this reference voltage is reduced with load reduction. Based on this equation (1) is modified to be:

$$V_{bus} = 1.285 V_m + 200 - K \quad (2)$$

where $$K = f\left(\frac{I_o}{I_{o(FL)}}\right)$$

and function $f$ can be selected based on the converter performance. $I_o$ is the output current and $I_{o(FL)}$ represents the full load output current.

This reduction in the output voltage 190 helps to maintain the operation of the resonant circuit close to the resonance frequency. Thus, efficiency at light load conditions can be improved.

Interleaved Converters

Figure 5:
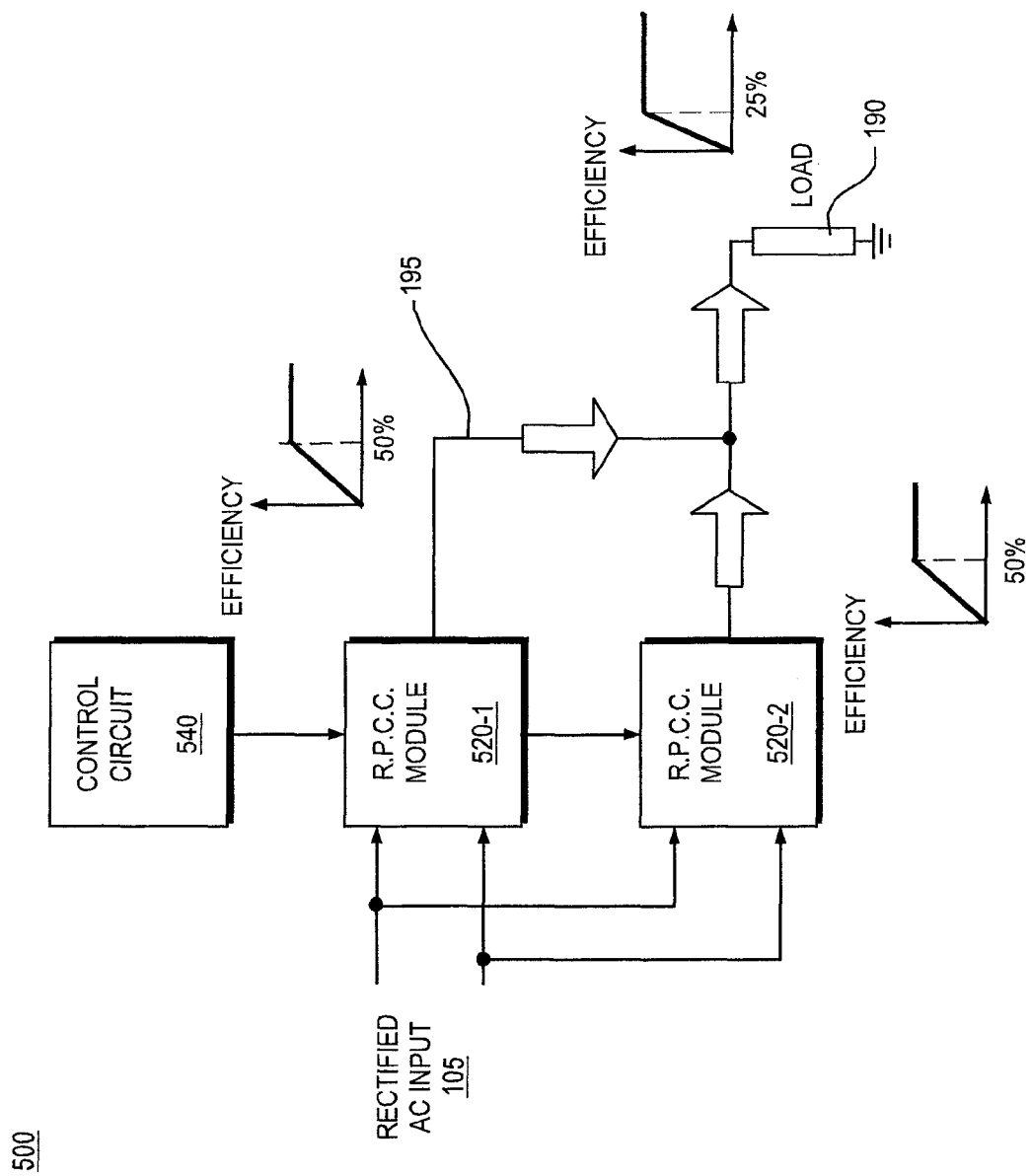
FIG. 5 is an example diagram illustrating operation of multiple resonant power converter circuit modules in parallel according to embodiments herein.

FIG. 5 is an example block diagram illustrating interleaving of multiple resonant power converter circuit modules according to embodiments herein. In general, control circuit 540 generates control signals to operate resonant power converter circuit modules 520-1 and resonant power converter circuit modules 520-2 to maintain output voltage 190 within an acceptable range.

A load adaptive dc-bus voltage reference is capable of providing an almost constant efficiency from full load down to about 40-50% of full load due to restrictions on the duty ratio and dc-bus voltage level. At lighter loads if $V_{bus}$ is too low, the duty ratio also becomes too low causing undesirable voltage dips at the output. Therefore, a minimum value for $V_{bus}$ can be set to ensure this does not happen In order to improve the conversion efficiency at light load conditions, the use of interleaved converters is proposed. By operating fewer resonant power converter circuit modules during light load conditions and multiple resonant power converter circuit modules during heavy load conditions, the efficiency region of power converter system 500 can be increased over a range of different loads.

As an example, for two similar converters, each with high efficiency range achieved until 50% of the full load, which are connected in parallel; if the total load is above 50% of the full load, then both converters are operated simultaneously. If the output power drops to 50% of the full load or less, one module is shutdown while the other is kept operating starting from its individual full load, thus improving the overall system efficiency at light load condition. The high efficiency region of the combined system is therefore, extended to 25% of full load.

Figure 6:
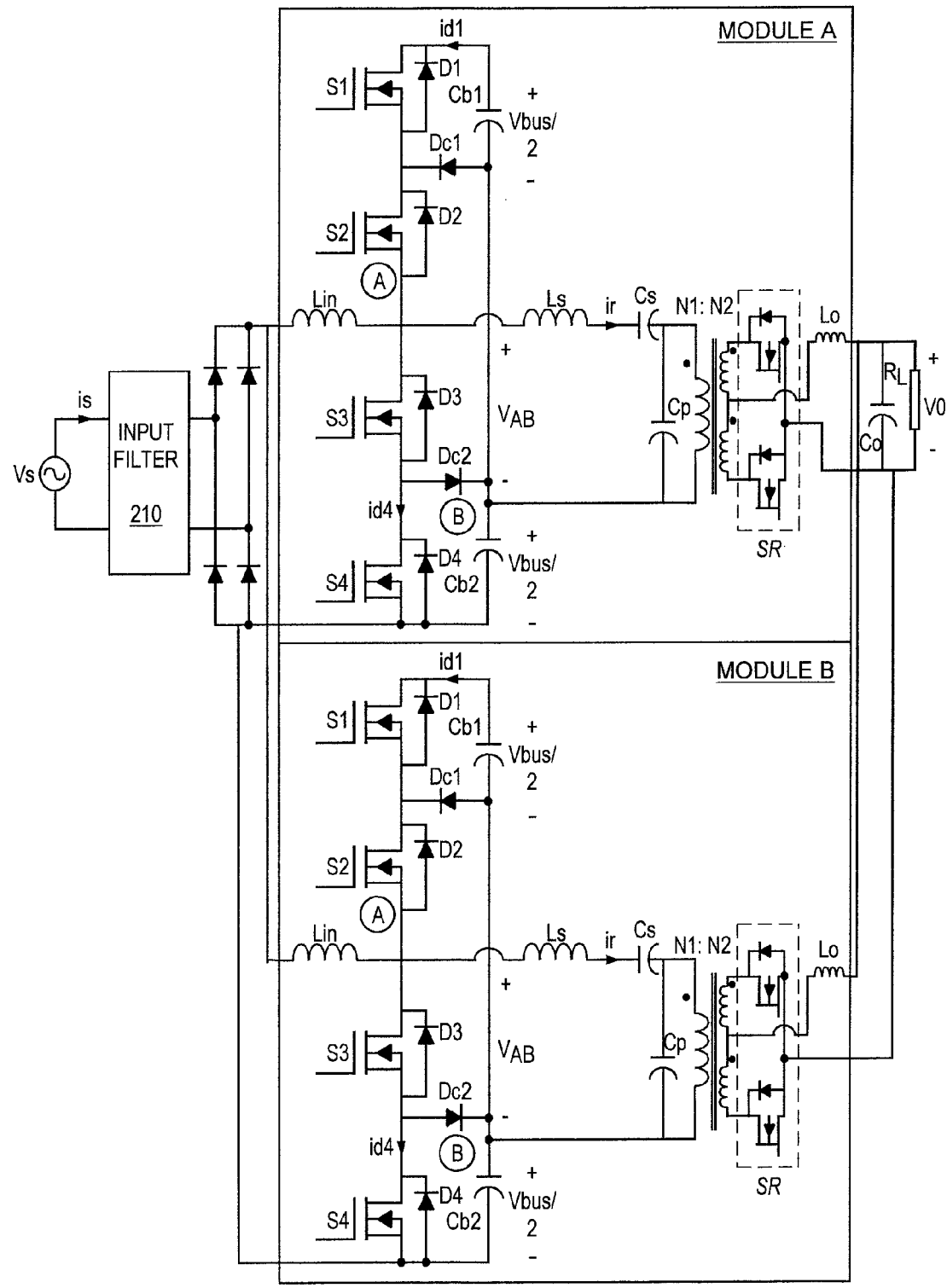
FIG. 6 is an example diagram illustrating operation of multiple resonant power converter circuit modules in parallel according to embodiments herein.

FIG. 6 is an example circuit diagram illustrating interleaving of multiple resonant power converter circuit modules according to embodiments herein.

Steady State Analysis

The operation of the proposed converter at steady state can be separated into two main sections: the first is from the AC input to the DC-bus, and the second from the DC-bus to the output through the resonant circuit.

In a similar manner as mentioned above for the single resonant power converter circuit module case, the two variables controlling the operation of the interleaved converters in both sections are the duty cycle (D) and the switching frequency ($f_s$).

Dead times between switching transitions are neglected in the analysis as these times are very short as compared to power transfer and freewheeling modes. The following subsections include a detailed description of the steady state operation for the whole converter in addition to design and performance characteristics curves.

A. Analysis of the Boost Operation (from AC Input to DC-Bus)

The operation in this part of the converter differs according to whether the input inductor is operating in the discontinuous or continuous conduction mode.

Discontinuous Conduction Mode

For discontinuous conduction mode operation, the input current will start and end at zero, and at the end of energy storage time in one switching cycle it can be given as:

$$L_{in}\frac{d i_{Lin(charging)}}{dt} = |v_s|_k \quad (3)$$

$$i_{Lin(charging)}(t=D_k T_s|_k) = i_{Lin}|_{peak} = \frac{|v_s|_k D_k T_s|_k}{L_{in}} \quad (4)$$

where, $i_{Lin}$: is the input inductor current, which is the rectified input current ($i_s$)

$$i_{Lin} = |i_s|, \quad (5)$$

$v_s$: is the input AC supply voltage,
D: is the duty cycle,
$T_s$: is the switching period $$T_s = \frac{1}{f_s},$$

such that, $f_s$ is the switching frequency,
$L_{in}$: is the input inductor,
and subscript (k): denotes the switching cycle where calculation is made.

During the freewheeling mode, the current decays to zero, and is thus given by:

$$L_{in}\frac{d i_{Lin(charging)}}{dt} = |v_s|_k - V_{bus(k)} \quad (6)$$

$$i_{Lin(charging)}(t=(D_k+d_k)T_s|_k)=0=i_{in}|_{peak} - \frac{(V_{bus(k)}-|v_s|_k)d_k T_s|_k}{L_{in}} \quad (7)$$

where, $V_{bus}$: is the dc-bus voltage (the sum of the voltages across capacitors $C_{b1}$ and $C_{b2}$)

$d_k T_s|_k$: is the time required for the current to decay to zero.

By substituting from (4) in (7) $d_k$ can be expressed as:

$$d_k = \frac{|v_s|_k}{V_{bus(k)}-|v_s|_k} D_k \quad (8)$$

Therefore, the average input inductor current over one switching cycle is given by:

$$i_{Lin(ave)k} = \frac{1}{T_s|_k}\left(\int_0^{D_k T_s|_k} i_{Lin(charging)}\,dt + \int_{D_k T_s|_k}^{(d_k+D_k)T_s|_k} i_{Lin(discharging)}\,dt\right) \quad (9)$$

Equation (7) can thus be solved as:

$$i_{Lin\,ave)k} = \left[\frac{|v_s|_k}{L_{in}f_s|_k} + \left(\frac{|v_s|_k^2}{(V_{bus(k)}-|v_s|_k)L_{in}f_s|_k}\right)\right]\frac{D_k^2}{2} \quad (10)$$

Therefore, the average value of the AC input current per switching cycle can be given by:

$$i_{s(ave)k} = \mathrm{sgn}(v_s)\left\{\left[\frac{|v_s|_k}{L_{in}f_s|_k} + \left(\frac{|v_s|_k^2}{(V_{bus(k)}-|v_s|_k)L_{in}f_s|_k}\right)\right]\frac{D_k^2}{2}\right\} \quad (11)$$

where, sgn($v_s$): takes the values ±1 according to the sign of the input voltage.

From equations (10) and (11), it is apparent that the harmonic content of the input current depends on the switching frequency, duty cycle, and the DC-bus voltage level (e.g., internal bus voltage).

The distortion level is inversely proportional to the switching frequency, directly proportional to the square of the duty cycle and inversely proportional between the difference between the output and input voltages, i.e. the higher the DC-bus voltage the lower the distortion. Therefore, the dc-bus voltage can be chosen such that the input current harmonic content standards are met without having an excessively high $V_{bus}$. This voltage is then reduced gradually, as the load is reduced keeping in consideration that the duty ratio is sufficient to produce the required output voltage level without the occurrence of low frequency ripples or voltage dips. For this to be achieved, the associated duty ratio and corresponding $V_{bus}$ are calculated and then these two values are used to calculate the resulting output voltage, if they cannot achieve the required output voltage at resonance frequency, then the value of D and $V_{bus}$ are too low and have to be modified. A set of values for $V_{bus}$ can thus be collected and the function $f(I_o/I_{o(FL)})$ in equation (2) can be interpolated. The relation between the minimum duty ratio and bus voltage is given by:

$$D_{min} = \sqrt{\left[\left(\frac{2V_{bus}}{V_m}-1\right)^2 - 1\right]\frac{L_{in}f_s P_o}{2V_{bus}^2}} \quad (12)$$

The condition of discontinuous conduction mode can be guaranteed if the input inductor ($L_{in}$) satisfies the following condition:

$$L_{in} \leq \frac{V_{bus}^2 T_s D(1-D)^2}{2P_o} \tag{13}$$

where, $P_o$ is the required output power.

Continuous Conduction Mode

For continuous conduction mode the input inductor has to satisfy the condition in (14) and the duty cycle will, therefore, be related to the circuit voltages by equations (15) and (16) as follows:

$$L_{in} > \frac{V_{bus}^2 T_s D(1-D)^2}{2P_o} \tag{14}$$

$$\frac{V_{bus}}{V_m|\sin\omega_l t|} = \frac{1}{1-D(t)} \tag{15}$$

$$\therefore D(t) = 1 - \frac{V_m}{V_{bus}}|\sin\omega_l t| \tag{16}$$

where the notation D(t) indicates that the duty ratio changes during the line frequency half cycle. All these derivations are still made under the assumption that the switching frequency is much higher than the power line frequency and therefore, the AC input voltage 105 can be considered constant during the switching cycle.

Using average current mode control the whole converter is seen by the supply as an equivalent resistor $R_e$ whose value varies continuously with the sinusoidal cycle of the input voltage in such a way that the average power remains balanced between the input and the output. For average current mode control, the value of $R_e$ is determined by the control signal generated from the DC-bus voltage and input current control signal. In this case the average input current in one switching cycle is given as in equation (17):

$$I_{L_{in}(ave)k} = \frac{|V_m \sin\omega_l t|}{R_e} \tag{17}$$

The current ripple around the average in this case would be:

$$\Delta i_{L_{in}} = \frac{|V_m \sin\omega_l t| D T_s}{2 L_{in}} \tag{18}$$

And thus, the peak input current can be expressed as:

$$i_{L_{in}}|_{peak} = I_{L_{in}(ave)k} + \Delta i_{L_{in}} = \frac{|V_m \sin\omega_l t|}{R_e} + \frac{|v_s|_k D_k T_s|_k}{2 L_{in}} \tag{19}$$

which is much less than that in discontinuous conduction mode due to the larger value of input inductance needed to maintain continuous conduction. It is seen here that for ideal operation the input current should follow the sinusoidal input waveform better than the case of discontinuous conduction; but some design considerations, discussed later in this section, lead to deviations from this ideal case.

Referring again to FIG. 4, this mode of operation may include an additional measurement of the input current, in order to be able to operate with a current mode control. This additional feedback signal can be eliminated if a current estimation technique is used. This will consequently lead to a smaller size and more reliable converter.

The duty cycle in this case, ranges between a minimum value of $$D_{min} = \frac{V_{bus} - V_m}{V_{bus}}$$

and a maximum value of 1 occurring at the zero crossings of the sinusoidal input voltage. It is also worth noting that, the duty cycle ratio may be limited to a certain value below 1 such that the power flow to the output remains sufficient to supply the load. Therefore, based on the selection of the DC-bus voltage, the range of variation of the duty ratio over the line frequency period is determined.

B. Analysis of the Resonant Circuit (from DC-Bus to Output)

In order, to study the performance of the resonant circuit stage, frequency analysis techniques were used to model the circuit. For a series parallel LCC resonant circuit the equivalent AC load is given by:

$$R_{ac} = \frac{\pi^2}{8}\left(\frac{N_1}{N_2}\right)^2 R_L \tag{20}$$

where, $N_1$ and $N_2$ are the primary and secondary turns, respectively, of the isolating transformer.

The input voltage to the resonant circuit is shown in FIG. 3. The Fourier series expansion of this waveform is given by:

$$v_{AB} = \frac{(1-2D)}{2}V_{bus} + \sum_{n=1}^{\infty} \frac{\sqrt{2}\,V_{bus}}{n\pi}\sqrt{1-\cos\alpha_n}\,\sin\left(2\pi n f_s t + \tan^{-1}\left(\frac{\sin\alpha_n}{1-\cos\alpha_n}\right)\right) \tag{21}$$

$$\alpha_n = 2\pi n(1-D) \tag{22}$$

where,
$f_s$ is the switching frequency
and, n is the harmonic order.

The dc component of $v_{AB}$ is blocked by the resonant circuit. Therefore, the transformer primary voltage can be given as:

$$v_P = \sum_{n=1}^{\infty} \frac{V_m |Z_P|_{(n)}}{|Z_{tot}|_{(n)}} \sin(2\pi n f_s t + \phi_n + \theta_{pn} - \theta_n) \tag{23}$$

where, $$Z_{p(n)} = \frac{R_{ac}(1 - jn\omega_s R_{ac} C_P)}{(1 + n^2 \omega_s^2 R_{ac}^2 C_P^2)} \tag{24}$$

$\theta_{pn}$ is the angle of $Z_{p(n)}$ such that $$\theta_{pn} = \tan^{-1}\left(\frac{\text{Im}(Z_{p(n)})}{\text{Re}(Z_{p(n)})}\right) \tag{25}$$

and $$Z_{tot(n)} = \frac{R_{ac}}{1+n^2\omega_s^2 R_{ac}^2 C_P^2} + j\left(n\omega_s L_s - \frac{1}{n\omega_s C_s} - \frac{n\omega_s R_{ac}^2 C_P}{1+n^2\omega_s^2 R_{ac}^2 C_P^2}\right) \quad (26)$$

$\theta_n$ is the angle of $Z_{tot(n)}$ such that $$\theta_n = \tan^{-1}\left(\frac{\text{Im}(Z_{tot(n)})}{\text{Re}(Z_{tot(n)})}\right)$$

The resonant circuit current is, therefore, given by:

$$I_{r(n)} = \frac{v_{AB(n)}}{Z_{tot(n)}} \quad (27)$$

$$\therefore i_r = \sum_{n=1}^{\infty} \frac{\sqrt{2}\,V_{bus}}{n\pi |Z_{tot(n)}|} \sqrt{1-\cos\alpha_n}\,\sin\left(2\pi n f_s t + \tan^{-1}\left(\frac{\sin\alpha_n}{1-\cos\alpha_n}\right) - \theta_n\right) \quad (28)$$

where $\theta_n$ has a positive value as long as the circuit is operating in the above resonant mode. This leads to a resonant current ($i_r$) lagging the input voltage (e.g., $v_{AB}$) to the resonant circuit, and that contributes to achieving zero voltage switching.

The transformer primary current is given by:

$$i_P = I_o\left(\frac{N_2}{N_1}\right)\text{sgn}(v_P) \quad (29)$$

CONCLUSION

The use of load adaptive dc-bus voltage as described herein is an effective method for improving the efficiency of single stage three-level resonant AC/DC such as, for example, converters those operating with VFAPWM control. This method allows the resonant converter to operate very close to its resonance frequency leading down to almost 40-50% of full load. This leads to a reduction in circulating currents in the resonant circuit and thus reducing the conduction losses.

For the lighter load conditions, the use of interleaved converters gives an almost constant efficiency curve for a much wider loading range. For two converters operating with VFAPWM and load adaptive dc-bus voltage, the efficiency remains constant down to 20% of full load. The use of more converters in parallel and designing them for different power levels can further enhance the efficiency curve.

Figure 7:
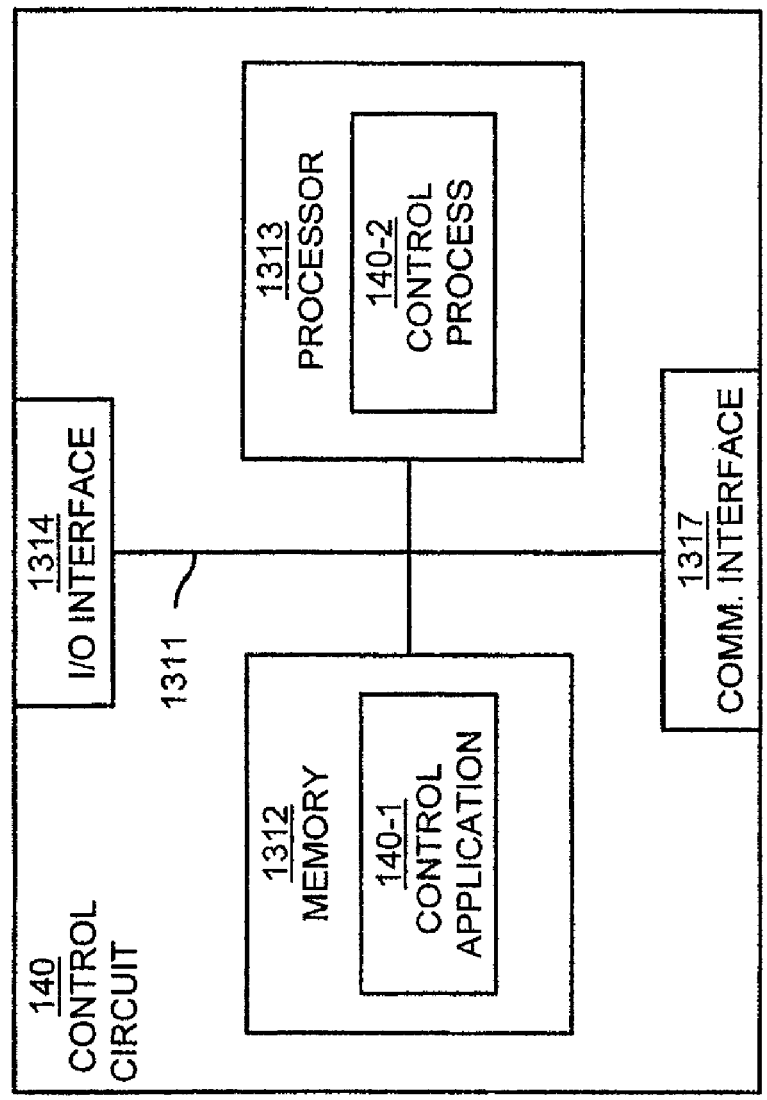
FIG. 7 is an example diagram illustrating a circuit for executing operations according to embodiments herein.

FIG. 7 is a diagram illustrating an example architecture for executing instructions, methods, techniques, etc., associated with control application 140-1 according to embodiments herein. The control circuit 140 can be configured to include a processor such as a DSP (Digital Signal Processor), FPGA (Field Programmable Gate Array), micro-controller, other customary control circuitry, etc., to carry out the techniques as discussed above and further below.

In such an embodiment, the control circuit 140 can include an interconnect 1311 that couples a memory system 1312, a processor 1313, an input/output interface 1314, and a communication interface 1317.

The memory system 1312 can be encoded with a control application 140-1 that enables the processor to support generation of appropriate data, control, and/or communication signal(s) to regulate output voltage 195 in a manner as described herein. Accordingly, a corresponding control application 140-1 can be embodied as software code such as data and/or logic instructions (e.g., code stored in the memory system 1313 or on another computer storage medium such as a disk) that supports processing functionality according to different embodiments described herein.

During operation according to one embodiment, the processor 1313 accesses the memory system 1312 via the use of interconnect 1311 in order to launch, run, execute, interpret or otherwise perform the logic instructions of the control application 140-1. Execution of the control application 140-1 produces processing functionality in control process 140-2. In other words, the control process 140-2 represents one or more portions of the control application 140-1 performing within or upon the processor 1313.

It should be noted that, in addition to the control process that carries out example method operations as discussed herein, other embodiments herein include the control application 140-1 itself such as the un-executed or non-performing logic instructions and/or data for producing control signal(s) to control each of one or more resonant power converter circuit modules as described herein.

The control application 140-1 may be stored on a computer readable medium (e.g., a repository) such as a floppy disk, hard disk or in an optical medium. According to other embodiments, the control application 140-1 can also be stored in a memory type system such as in firmware, read only memory (ROM), or, as in this example, as executable code within the memory system (e.g., within Random Access Memory or RAM), etc.

Note that in other example embodiments, any or all portions of the control circuit 140 can be configured as hardware such as combinatorial logic, digital circuits, analog circuits, etc. In certain embodiments, the control circuit 140 is a hybrid of software and hardware.

Functionality supported by control circuit 140 and power converter system 100 and related circuits will now be discussed via flowcharts in respective FIGS. 8 and 9. Note that there will be some overlap with respect to concepts discussed above. Also, note that the steps in the below flowcharts need not always be executed in the order shown.

Figure 8:
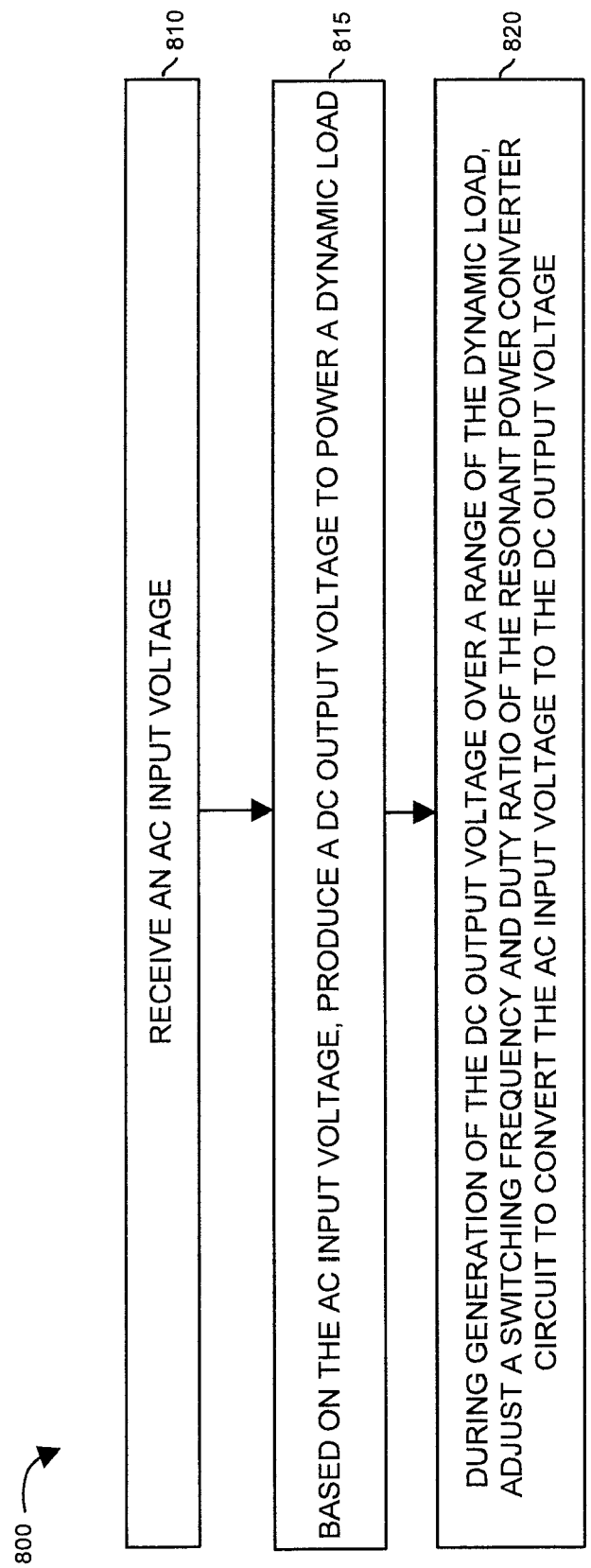
FIGS. 8 and 9 are example flowcharts illustrating methods according to embodiments herein.

More specifically, FIG. 8 is a flowchart 800 illustrating a technique of generating an output voltage according to embodiments herein.

In step 810, the power converter system receives an AC input voltage 105.

In step 815, based on the AC input voltage 105, the power converter system 100 produces a DC output voltage 195 to power a dynamic load 190.

In step 820, during generation of the DC output voltage 195 over a range of the dynamic load 190, the control circuit 140 adjusts a switching frequency of the resonant power converter circuit 120 to facilitate conversion of the AC input voltage 105 to the DC output voltage 195. In one embodiment, the control circuit 140 also adjusts the duty ratio to achieve power factor correction and regulate the internal DC voltage.

Figure 9:
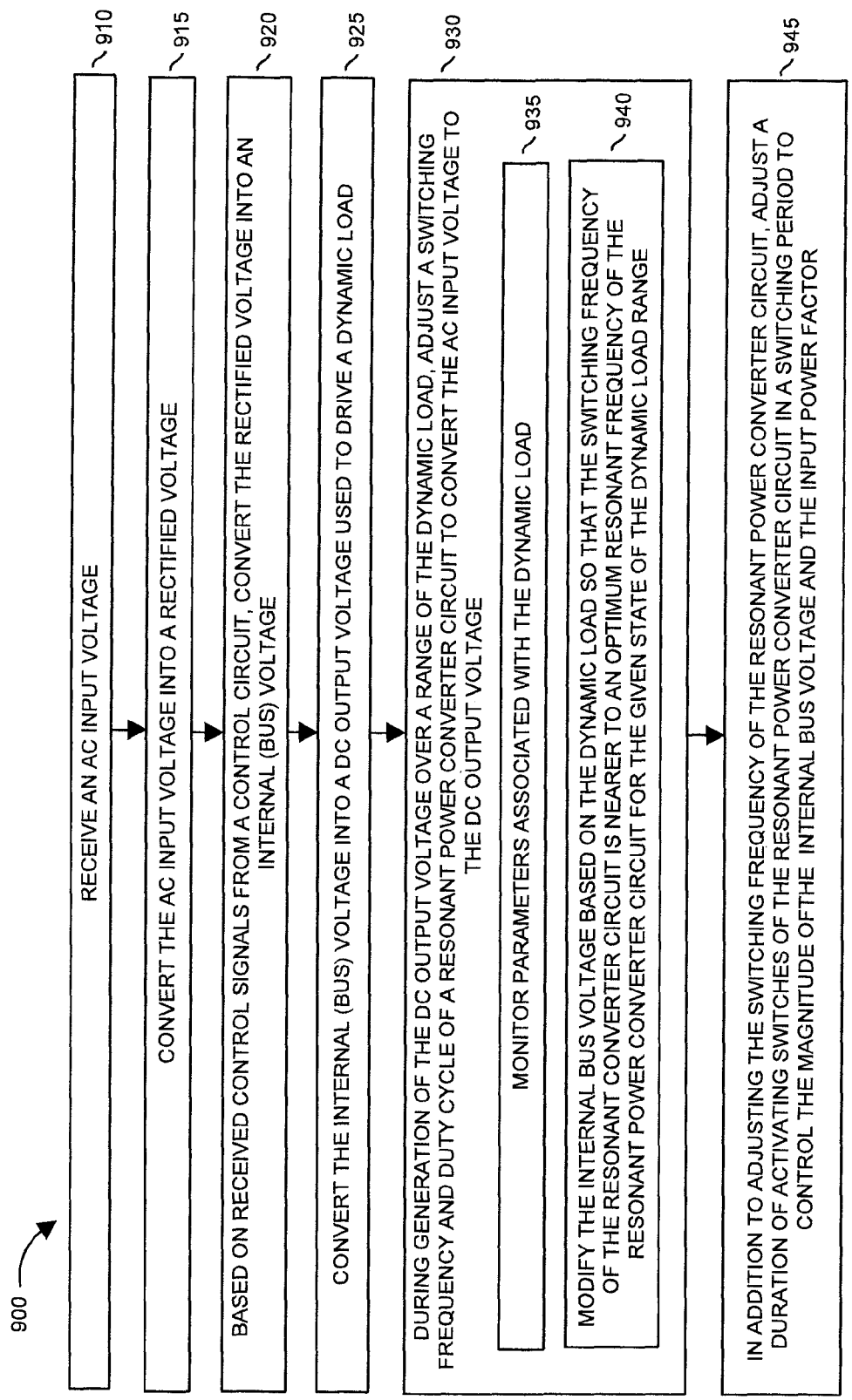

FIG. 9 is a flowchart 900 illustrating a technique of improving power supply efficiency and responsiveness based on switching between different operational modes according to embodiments herein.

In step 910, the power converter system 100 receives an AC input voltage 105.

In step 915, the rectifier circuit 110 of power converter system 100 converts the AC input voltage 105 into rectified voltage 115.

In step 920, based on received control signals 145 from control circuit 140, the switch circuit 122 converts the rectified voltage 115 into an internal (bus) voltage supplied to the resonant circuit 124.

In step 925, a combination of the resonant circuit and the output stage 126 converts the internal (bus) voltage into a DC output voltage 195 used to drive dynamic load 190.

In step 930, during generation of the DC output voltage 195 over a range of the dynamic load 190, the control circuit 140 adjusts a switching frequency and duty ratio of control signals 145 applied to the switch circuit 122 of resonant power converter circuit 120 to convert the AC input voltage 105 to the DC output voltage 195.

In sub-step 935, the control circuit 240 monitors a parameter associated with the dynamic load 190, according to which it adapts the value of the internal DC voltage reference.

In sub-step 940, the control circuit 140 modifies the internal bus voltage based on the dynamic load 190 so that the switching frequency of the resonant converter circuit operates closer to an optimum resonant frequency of the resonant circuit 124 for a given state of the dynamic load range.

In step 945, in addition to adjusting the switching frequency of the resonant power converter circuit, the control circuit 140 adjusts durations of activating switches in switch circuit 122 in one or more periods of the switching frequency to adjust a power factor of the power converter system 100 and to regulate the internal DC bus voltage 123.

Note again that techniques herein are well suited for use in power supply applications. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

Table 1 includes example values of the power converter system 100 parameters, including input and output voltages and example circuit component values

TABLE 1

Power converter System Parameters

| Parameter | Value |
|---|---|
| AC Input Voltage | 90-265 V RMS |
| DC Output Voltage | 12 V |
| Output Power | 1 kW |
| Input Inductor $L_{in}$ | 5 μH |
| DC-bus Capacitors ($C_{b1}$ and $C_{b2}$) | 680 μF |
| Resonant Inductor $L_s$ | 55 μH |
| Series Resonant Capacitor $C_s$ | 15 nF |
| Parallel Resonant Capacitor $C_p$ | 22 nF |
| Transformer Turns Ratio | 9:1:1 |
| Resonant Frequency $f_o$ | 175 kHz |
| Range of Frequency Variation | 1.02 $f_o$-1.5 $f_o$ |
| Output Inductor | 1 μH |
| Output Capacitor | 4700 μF |

What is claimed is:

1. A method comprising:
receiving an AC input voltage;
based on the AC input voltage, controlling a resonant power converter circuit to produce a DC output voltage to power a dynamic load; and
during generation of the DC output voltage over a range of the dynamic load:
monitoring the AC input voltage;
adjusting a pulse width modulation of a control signal inputted to the resonant power converter circuit to control a setting of an input power factor of the resonant power converter circuit;
monitoring the DC output voltage; and
adjusting a switching frequency of the control signal inputted to the resonant power converter circuit to regulate a magnitude of the DC output voltage within a desired range.

2. The method as in claim 1, wherein adjusting the switching frequency comprises:
monitoring a parameter associated with the dynamic load; and
modifying a magnitude of an internal DC bus voltage of the resonant power converter circuit so that the switching frequency of the resonant power converter circuit operates closer to the optimum resonant frequency of the resonant power converter circuit.

3. The method as in claim 1 further comprising:
monitoring the DC output voltage;
generating an error voltage based on a comparison of a magnitude of the DC output voltage with a reference voltage; and
adjusting the switching frequency based on a magnitude of the error voltage to regulate and maintain the DC output voltage within a voltage range.

4. The method as in claim 1 further comprising:
converting the AC input voltage to an internal DC bus voltage: and
in addition to adjusting the switching frequency of the resonant power converter circuit, adjusting a duration of activating switches of the resonant power converter circuit in a period of the switching frequency to control a magnitude of the internal DC bus voltage, the resonant power converter circuit converting the internal DC bus voltage into the DC output voltage.

5. The method as in claim 1 further comprising:
adjusting a duty cycle of activating switches in the resonant power converter circuit during periods of the switching frequency to control the input power factor associated with the resonant power converter circuit.

6. The method as in claim 5 further comprising:
within multiple periods of the switching frequency, adjusting a duty cycle of activating at least one switch in the resonant power converter circuit to, in turn, produce an internal bus voltage used to derive the DC output voltage.

7. The method as in claim 6, wherein adjusting the duty cycle reduces harmonic content of an input current and a corresponding phase difference between the AC input voltage and corresponding input current used by the resonant power converter circuit to produce the DC output voltage.

8. The method as in claim 1 further comprising:
generating a reference voltage that is substantially in phase with the AC input voltage; and
utilizing the reference voltage to control the input power factor associated with the resonant power converter circuit.

9. The method as in claim 1 further comprising:
converting the AC input voltage into a DC bus voltage, wherein a magnitude of the DC bus voltage of the resonant power converter circuit varies depending on the setting of the input power factor, the resonant power converter circuit converting the DC bus voltage into the DC output voltage.

10. The method as in claim 1, wherein adjusting the switching frequency includes:
adjusting a setting of an internal DC voltage of the resonant power converter circuit depending on a state of the dynamic load, adjustment of the setting of the internal DC voltage causing the switching frequency to operate closer to the resonance frequency of the resonant power converter circuit, the internal DC voltage derived based on power from the AC input voltage.

11. The method as in claim 1 further comprising:
controlling the pulse width modulation of the control signal to adjust an input current of the AC input voltage to be more in phase with the AC voltage.

12. The method as in claim 1 further comprising:
monitoring a phase of the AC input voltage; and
controlling the pulse width modulation of the control signal based on the phase of the AC input voltage.

13. The method as in claim 1 further comprising:
rectifying the AC input voltage;
generating a load adaptive internal DC voltage in the resonant power converter circuit based on the rectified AC input voltage, the load adaptive internal DC voltage causing the switching frequency to operate close to a resonant frequency of the resonant power converter circuit.

14. The method as in claim 1 further comprising:
monitoring an output current supplied by the resonant power converter circuit to the dynamic load; and
adjusting the pulse width modulation of the control signal inputted to the resonant power converter circuit based at least in part on a magnitude of the output current.

* * * * *